June 30, 1953  F. A. WAGNER ET AL  2,643,761
MEANS FOR UNLOADING ARTICLES FROM OVERHEAD CONVEYERS
Filed March 16, 1950
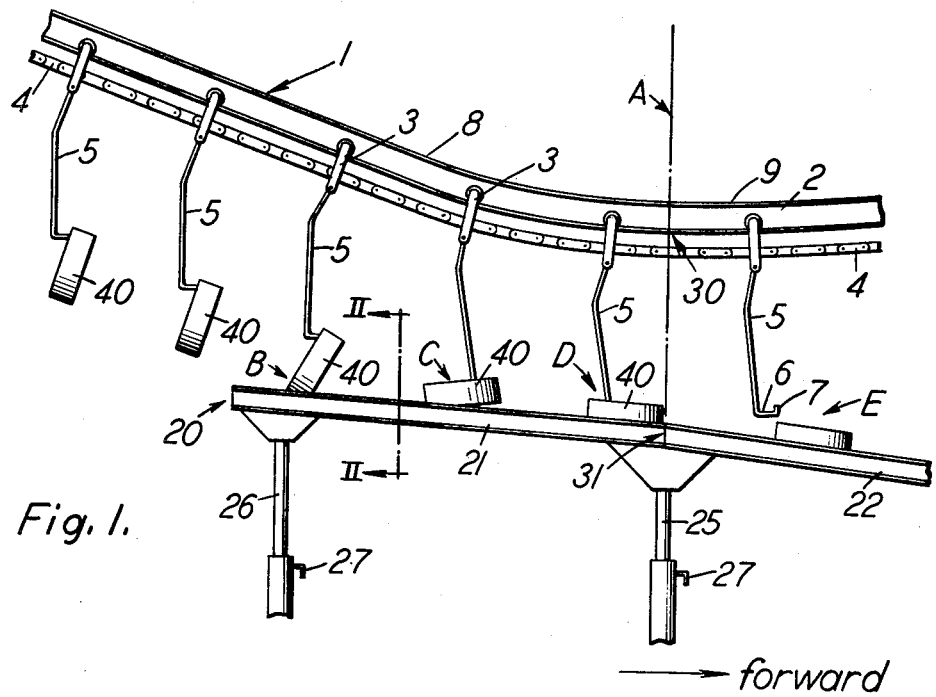
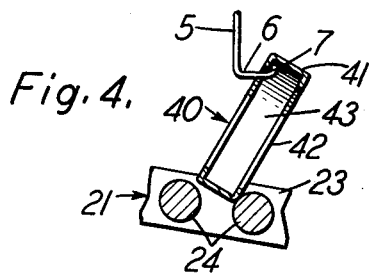
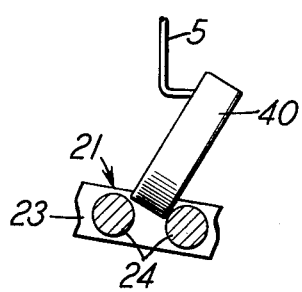
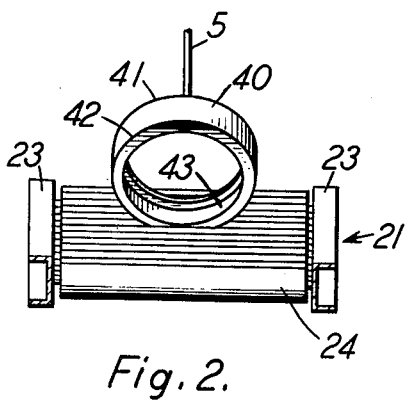
Inventors:
Frederick A. Wagner
Albert D. Pierce
John Gedmin
BY
Attorney Patented June 30, 1953

2,643,761

UNITED STATES PATENT OFFICE 2,643,761

MEANS FOR UNLOADING ARTICLES FROM OVERHEAD CONVEYERS

Frederick A. Wagner, East Lansing, and Albert D. Pierce and John Gedmin, Lansing, Mich., assignors to Campbell, Wyant and Cannon Foundry Co., Muskegon Heights, Mich., a corporation of Michigan Application March 16, 1950, Serial No. 149,918

1 Claim. (Cl. 198—177)

This invention relates to conveyor unloading mechanisms and more particularly to an arrangement including two cooperating conveyors whereby articles carried by one conveyor are automatically unloaded from this conveyor and deposited on the other conveyor.

Our conveyor unloading or transferring device is designed to handle articles of substantially uniform size and consisting essentially of a shell. In operations involving the handling of large quantities of such articles it becomes important to make every step in the handling operation as automatic as possible. To this end, the step of unloading the conveyor should be accomplished without either manual handling of the articles or the necessity for manual regulation of the mechanism designed to automatically accomplish this task. Particularly is manual handling to be avoided when the articles are heavy and hot. The mechanism for discharging the articles must be positive in operation whereby all of the articles are discharged, not just a high percentage of them.

It is common practice to transport heavy, shell-like articles by suspending them from a moving, overhead conveyor. Such conveyors, by necessity, positively grip and support the articles as compared to gravity roller, chute and belt conveyors on which the articles merely rest by their own weight. In the case of the overhead conveyor, the articles must be positively disengaged from the conveyor in the process of removal. Where the article is held by being seated over an upwardly turned hook, it is necessary to lift the article relative to the hook in order to effect disengagement. This complicates the problem of removing articles from this type of conveyor. Particularly does it make it difficult to accomplish this end by means of a simple and substantially inexpensive structure. Our invention contemplates the solution to this problem.

It is, therefore, a primary object of our invention to provide a mechanism capable of automatically discharging the articles from a continuously moving conveyor without intervention or regulation by an operator. Among the other objects of our invention is the provision of such a conveyor unloading mechanism having a structure of simple design and simple operation and adapted to the handling of a large quantity of articles without operational failure.

Other objects and purposes of our invention will be seen immediately by those acquainted with the design and use of materials handling equipment upon reading the following specification and the accompanying drawings.

In the drawings:

Figure 1 is a side elevation view of our invention.

Figure 2 is a sectional elevation view of our invention taken along the plane II—II of Figure 1.

Figure 3 is a fragmentary side sectional view of our invention showing one of the articles making initial contact with the receiving conveyor.

Figure 4 is a fragmentary side sectional view of our invention.

In the following description the terms "upwardly" and "downwardly" are frequently used and are to be taken as meaning "upwardly" in the direction in which the conveyors are normally used and as shown in Figure 1 and "downwardly" away therefrom. The terms "forwardly" and "rearwardly" are frequently used and are to be taken to mean "forwardly" in the direction of movement of the articles on the conveyor and as indicated by the arrow in Figure 1 and "rearwardly" away therefrom.

Our invention consists of a pair of conveyors, one above the other, which first converge toward each other and then separate. The articles are transferred from the upper conveyor to the lower conveyor adjacent the point of closest convergence by lowering the article carried by the upper conveyor until it becomes disengaged from the supporting means of the upper conveyor. The motion of the article on the lower conveyor is then accelerated whereby it moves away from the supporting means of the upper conveyor.

Referring to the drawings in greater detail, the numeral 1 indicates a first or upper conveyor having a track 2 on which ride a number of spaced trolleys 3 joined together by a chain 4. Means are provided for moving the chain 4 forwardly whereby each of the trolleys is caused to travel along the track 2. The driving means for the chain is neither illustrated nor described in detail since it may be of any suitable conventional design. Depending from each of the trolleys 3 is a hanger 5 having a forwardly directed hook 6 at its lower end. The hooks 6 are each U-shaped, having a short, upwardly projecting knob 7 at its forward end. Each of the hangers 5 is pivotally mounted to its supporting trolley 3 in such a manner that it may freely swing in a forward and rearward direction but not crosswise to the movement of the conveyor.

The track 2 is designed to have an inclined portion 8 extending downwardly in the direction of movement of the trolleys 3. At the forward or lower end of the inclined portion 8, the forward portion 9 of the track 2 assumes a substantially horizontal position. This forward portion 9 need not necessarily be horizontal; it may be slightly upwardly inclined or downwardly inclined but at a greatly reduced angle as compared to the inclined portion 8. The relative angular position between the lower conveyor 20 and this forward portion 9 of the track 2 will necessarily have to be adjusted to provide the desired relationship between the upper and lower conveyors depending upon the path followed by the forward portion 9 of the track 2.

Below the discharge or upper conveyor 1 is a second or lower conveyor 20 extending in the same direction as the upper conveyor 1. The lower conveyor 20 is in effect the receiving conveyor. The lower conveyor consists of a rearward or receiving section 21 and a forward or runway section 22 joined together to form a continuous track. Both the forward section 22 and the rearward section 21 are downwardly inclined in a forward direction but the angle of downward inclination of the forward section 22 is greater than that of the rearward section 21. The lower conveyor 20 is made up of standard, roller type, gravity conveyor sections each consisting of a pair of spaced side rails 23 having freely rotating rollers 24 mounted between them. The lower conveyor 20 is supported by any suitable means such as the vertical standards 25 and 26. The standards 25 and 26 are made vertically adjustable by any suitable conventional means, such as by telescoping members locked together by the threaded handle 27. It is also possible to eliminate the vertical standards 25 and 26 and suspend the lower conveyor 20 from above by means of rods or cables, also vertically adjustable.

The upper conveyor 1 and the lower conveyor 20 are designed and arranged, in a forwardly direction, first to converge and then diverge. The point of tangency 30 between the inclined portion 8 and the forward portion 9 of the track 2 of the upper conveyor 1 is designed to be vertically aligned with the juncture point 31 between the forward section 22 and the rearward section 21 of the lower conveyor 20. The point at which the upper conveyor 1 and the lower conveyor 20 attain their point of greatest convergence is rearwardly of but adjacent to the juncture point 31 and is indicated on the drawings as plane A. At plane A the spacing between the upper conveyor 1 and the lower conveyor 20 is such that the hooks 6 pass just above the rollers 24 but without contacting the rollers 24. The particular spacing between the hooks 6 and the rollers 24 will vary according to the design of the articles being transported by the conveyors, as will appear more fully hereinafter.

Rearwardly of the plane A the upper conveyor 1 and the lower conveyor 20 separate at an angle less than the angle of inclination of the inclined portion 8 of the upper conveyor 1. Like the spacing between the conveyors at the plane A, the angle of divergence between the conveyors rearwardly of the plane A will be different under different operating conditions depending upon the design of the articles being carried. Forwardly of the plane A the conveyors diverge and again the particular angle is dependent upon the design of the article being carried.

The articles 40 must be of a shape adapted to be securely held by the hook 6, that is, they must have some type of rim or ridge under which the knob 7 may seat (Fig. 4) to anchor the article to one of the hangers 5. Although there are a number of article shapes capable of being satisfactorily handled by our conveyor system, for the purpose of brevity, only one form is described. The articles 40 each have an annular shell 41 equipped with short, radially inwardly extending flanges 42 on each side. The combination of the shell 41 and flanges 42 creates an inwardly opening channel 43. The articles 40 are suspended on the upper conveyor 1 by the hook 6 extending into the article with the knob 7 engaging the inner face of one of the flanges 42.

Operation

The hangers 5 of the upper conveyor 1 are moved forwardly by means of the chain 4. Each of the hangers 5, as it descends the inclined portion 8 of the upper conveyor 1, has one article 40 suspended from its hook 6. As each of the hangers 5 moves over the rearward end of the lower conveyor 20, the lower end of the article 40 strikes the rollers 24 of the rearward section of the lower conveyor 20 (station B, Figure 1 and Figure 3). This temporarily suspends further forward motion of the lower end of the article. As the hanger 5 continues to move forwardly and downwardly due to the downward inclination of the track 2, the upper end of the article 40 moves forwardly and downwardly in relation to the lower end of the article 40. Further forward movement of the hanger drags the entire article forward while continuing to lower the upper end of the article (station C, Figure 1). Since the lower conveyor 20 is inclined downwardly in the direction of movement of the hanger 5, the article has a tendency to accelerate its forward motion by reason of gravity. However, it is normally restrained by the holding effect of the hanger 5. The continued downward movement of the hanger finally lowers the article until it rests entirely upon the lower conveyor 20 and the knob 7 disengages the flange 42 of the article 40 (station D, Figure 1). The hanger continues to be lowered toward the lower conveyor until plane A is reached, thereafter it is, in effect, withdrawn upwardly again. Once the article is freed by the hanger its forward motion accelerates and it moves forwardly of the hanger, pivoting the hanger forwardly and upwardly out of its way as it escapes. The article 40, once having moved forwardly of the juncture point 31, accelerates rapidly, leaving the hangers 5 entirely (station E, Figure 1).

It is seen from the above description that it is necessary to design both the upper conveyor 1 and the lower conveyor 20 to slope downward in the same direction. It is also necessary, rearwardly of the plane A, that the upper conveyor 1 decline more rapidly than the lower conveyor 20 whereby the upper conveyor's downward movement will not only nullify the downward slope of the lower conveyor but will actually converge with the lower conveyor. It is essential to provide the lower conveyor with some downward slope in order to cause the articles 40 to accelerate forwardly and thus escape the hangers 5 once the articles 40 are free to move under their own gravitational impetus.

The precise angle at which the upper conveyor 1 and the lower conveyor 20 converge is dependent upon the size of the articles 40 being handled. The larger the article, the greater the angle described between the conveyors and vice versa. As an example, we have found that an angle preferably between 10° and 15° and an optimum angle of 12° provides a relationship between the conveyors at which annular articles 40 having diameters within the range of 12 and 16 inches are satisfactorily transferred from the upper conveyor to the lower conveyor without operational failure.

The precise spacing necessary between the hangers 5 and the rollers 24 at the plane A is dependent upon the width of the article 40. That is, the wider the flanges 42 are spaced apart, the greater the distance can be between the hangers 5 and the rollers 24 and still permit the hanger to swing free of the article when the article is resting entirely upon the lower conveyor 20. The position of the point of closest convergence or of least vertical spacing between the upper conveyor 1 and the lower conveyor 20 may be located somewhat rearwardly of the position herein described as plane A. Preferably, this point is adjusted by relocating the juncture point 21 between the forward section 22 and the rearward section 21 of the lower conveyor 20 rearwardly in relation to the upper conveyor 1 rather than making a rearward adjustment of the point of tangency 30 between the inclined portion 8 and the forward portion 9 of the upper conveyor 1. Any such adjustment of the position of the point of closest convergence will normally require an adjustment of the angle of inclination of the rearward section 21 of the lower conveyor 20.

We have described the structure and operation of a conveyor unloading device whereby articles suspended from an overhead conveyor may be successively and automatically transferred from the overhead conveyor to a gravity conveyor either as a means of unloading the overhead conveyor or as a means for transferring the articles from one type of conveying system to another.

Numerous modifications of our invention may be made each without changing the principle of our invention. Each of these changes is to be considered as included in the hereinafter appended claim unless said claim by its language expressly provides otherwise.

We claim:

In means for automatically unloading articles from a conveyor, the combination comprising: a continuously moving, powered, upper conveyor including a track having a downwardly inclined portion; a lower conveyor having a plurality of freely rotatable article supporting rollers; said lower conveyor having a first downwardly inclined portion and a second downwardly inclined portion, said second portion inclined at a steeper angle than said first portion; said upper conveyor and said lower conveyor vertically aligned and extending in the same direction; a plurality of depending, spaced hangers movable along said upper track in the direction of inclination of said upper track; an article engaging hook on the end of each of said hangers, each of said hooks extending from its hanger in the direction of movement of said hangers; said upper conveyor at the lower end of its downwardly inclined portion and said lower conveyor substantially at the juncture of its first portion and its second portion having their point of closest convergence; at their point of closest convergence said upper conveyor and said lower conveyor spaced apart a distance greater than the length of said hangers and less than the length of said hangers plus the width of one of said articles; said upper conveyor and said lower conveyor diverging from each other on each side of said point of closest convergence whereby an article carried by one of said hangers will be deposited upon said lower conveyor as the hanger supporting said article approaches said point of closest convergence and said hanger will be further lowered to disengage said hook from said article as the movement of said article accelerates in the direction of downward inclination of said lower conveyor; said upper conveyor and the first portion of said lower conveyor upstream from said point of closest convergence, relative to the movement of said upper conveyor, being for a substantial distance spaced apart less than the length of one of said hangers plus the length of one of said articles whereby said rollers engage and retard the lower end of said article while the upper end of said article is simultaneously carried downstream and lowered by the movement of said upper conveyor.

FREDERICK A. WAGNER.
ALBERT D. PIERCE.
JOHN GEDMIN.

References Cited in the file of this patent

UNITED STATES PATENTS

| Number | Name | Date |
|---|---|---|
| 801,523 | Hinchman et al. | Oct. 10, 1905 |
| 1,226,253 | Reese | May 15, 1917 |